FREQUENCY MODULATOR RECORDING HEAD

Filed June 28, 1961 2 Sheets-Sheet 1

INVENTOR.
HENRY RAY WARREN
BY Morris L. Rabkin
ATTORNEY

FREQUENCY MODULATOR RECORDING HEAD

Filed June 28, 1961 2 Sheets-Sheet 2

INVENTOR.
HENRY RAY WARREN
BY Morris A. Rabkin
ATTORNEY 3,229,046

FREQUENCY MODULATOR RECORDING HEAD

Henry Ray Warren, Haddonfield, N.J., assignor to Radio Corporation of America, a corporation of Delaware Filed June 28, 1961, Ser. No. 120,244
7 Claims. (Cl. 179—100.2)

The present invention relates to an improved magnetic recording system, and more particularly a frequency modulation magnetic recording system.

The invention is especially suitable for recording of high frequency, broad band signals, such as video and television signals, and is particularly applicable to recording systems where the requirements are to reduce weight, size and power, as in mobile, airborne or spaceborne apparatus.

In a system for reproducing or reading signals from a magnetic record, as disclosed in a patent to L. L. Burns, Jr., Patent No. 2,536,260, issued January 2, 1951, a signal is derived from the record by a magnetic head and is used to effectively alter the permeability of a portion of the core of magnetic material which forms a part of the head. This permeability variation is reflected as a change in the inductance of a coil and the frequency modulation of an oscillator which includes that coil.

The portion of the core which exhibits the permeability variation is isolated from the signal gap of the head so that the frequency modulated oscillations are not translated by the head into magnetic flux which can affect the record. Accordingly, the reproducing system disclosed in the Burns, Jr. patent does not utilize the principle of signal induced permeability alterations for the recording of frequency modulated signals.

It is an object of the present invention to provide a system for the recording of frequency modulated signals, which system utilizes the principle of signal induced permeability variations.

It is a further object of the invention to provide a system for the magnetic recording of frequency modulated signals in which frequency modulation of signals and the recording thereof is accomplished by the same instrumentality, namely, a magnetic head.

It is a further object of the present invention to provide an improved magnetic recording system for the recording of frequency modulated signals which has a higher efficiency of operation than known frequency modulation magnetic recording systems, and in which power requirements are reduced.

It is a still further object of the present invention to provide an improved frequency modulation recording system which is adaptable to miniaturization.

It is a still further object of the invention to provide improved apparatus for efficiently handling signals which vary in frequency.

Briefly described, a frequency modulation magnetic recording system according to the invention includes a recording head having a core with modulating and oscillator windings thereon. The oscillator winding may form part of the frequency determining or tank circuit of an oscillator. The oscillations in the oscillator winding are translated into magnetic flux in the core. This flux is applied, by the head, to the magnetic record. A signal carrying the information to be recorded is applied to the modulating winding and varies the permeability of the core. The inductance in the oscillator tank circuit and the frequency of oscillation of the oscillator then varies in accordance with the information signal. The frequency of the magnetic flux established in the core by the oscillator winding and applied to the record is therefore modulated by the information signal. The tank circuit may be a parallel combination of inductive and capacitive (L-C) elements. The current and power drawn by the head is reduced, since a parallel R-L-C circuit draws minimum current when operated at its resonant frequency. The recording head may be called a frequency modulator recording head since it both generates and records frequency modulated signals.

The invention itself, both as to its organization and method of operation, as well as additional objects and advantages thereof, will become more readily apparent from a reading of the following description in connection with the accompanying drawings, in which.

Figure 1:
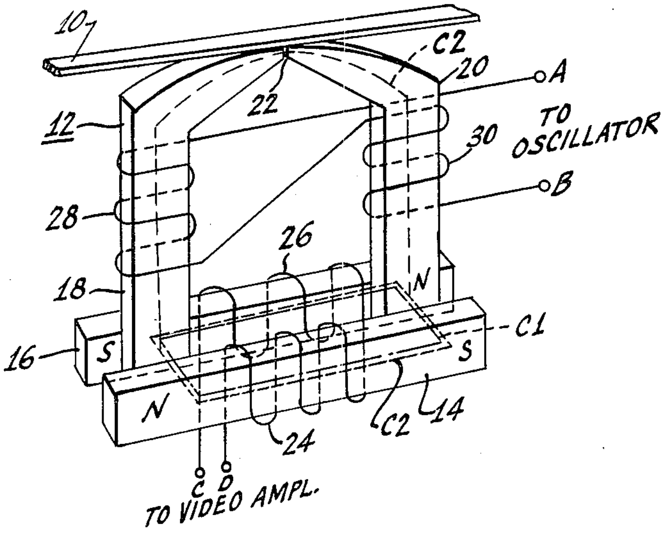
FIG. 1 is a perspective view which diagrammatically illustrates a frequency modulator magnetic head in accordance with the invention.

Referring more particularly to FIG. 1, there is shown a magnetic record in the form of a magnetic tape 10. Other forms of magnetic records such as drums and discs may also be employed. A frequency modulator recording head 12 cooperates with the tape 10, and is shown scanning the tape. The head 12 may be mounted in a support of non-magnetic materials, such as a potting resin. However, the core structure and windings of the head 12 are shown without such support for clarity of illustration. This core structure includes a first or bottom pair of core legs 14 and 16 and a second or side pair of core legs 18 and 20. The pole ends of the side core legs 18 and 20 are spaced from each other by a spacer of non-magnetic material to define a signal gap 22. The bottom legs 14 and 16 are spaced from each other in parallel relationship by the lower ends of the side core legs 20 and 18. These bottom core legs 14 and 16 are also in tight engagement with the lower ends of the side core legs 18 and 20.

The bottom core legs 14 and 16 and the lower ends of the side core legs 18 and 20 define a first closed magnetic circuit or flux path C1, indicated by the labelled dotted line. A second magnetic circuit or flux path C2, closed except for signal gap 22, is defined by the side core legs 18 and 20 and the bottom core legs 14 and 16 and indicated by the dot-dash lines. The bottom core legs 14 and 16 are desirably formed from a "soft" (non-retentive) magnetic material having an "S" shaped hysteresis characteristic. The side legs 18 and 20 are desirably formed from soft magnetic material, such as a soft ferrite. A suitable material for the bottom core legs is Alfenol.

A pair of serially connected windings 24 and 26 is wound around the bottom core legs 14 and 16, respectively, these windings having terminals C and D. The windings 24 and 26 are referred to hereinafter as modulating windings. These modulating windings 24 and 26 are balanced with respect to the second magnetic circuit which includes the signal gap 22. The windings 24 and 26 may be balanced by winding each of them in the same sense, as indicated in FIG. 1 and connecting one pair of adjacent terminals. The windings 24 and 26 are balanced, that is, current in them generates equal and aiding M.M.F.'s (magnetomotive forces) and flux in the first magnetic circuit C1, and equal and opposing M.M.F.'s and flux in the second magnetic circuit C2. Therefore, the magnetic fluxes established by the modulating windings 24 and 26 do not enter the side legs 18 and 20 (or cancel therein) and do not flow around the second magnetic circuit or across the signal gap 22.

Serially connected windings 28 and 30 are wound respectively around the side legs 18 and 20 in opposite senses. Terminals A and B are connected to the free ends of the windings 28 and 30. Signals applied across the terminals A and B establish fluxes in the side leg 18 and in the side leg 20 which tend to aid each other in the second magnetic circuit C2. These fluxes in the second magnetic circuit C2 traverse the signal gap 22. Accordingly, these fluxes will be applied to the magnetic recording tape 10 and be recorded on the tape 10 as magnetic signals. The windings 28 and 30 are referred to hereinafter as oscillator windings.

Figure 2:
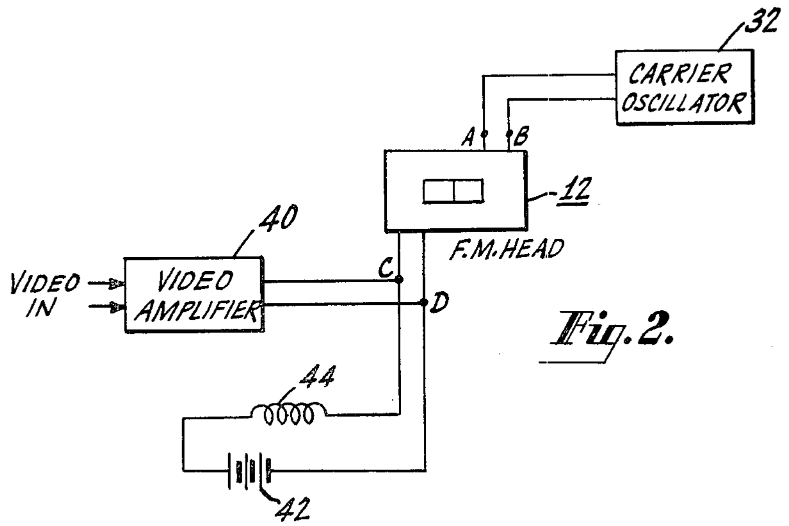
FIG. 2 is a block diagram of a frequency modulation recording system, in accordance with the invention, incorporating a head like that shown in FIG. 1.
Figure 5:
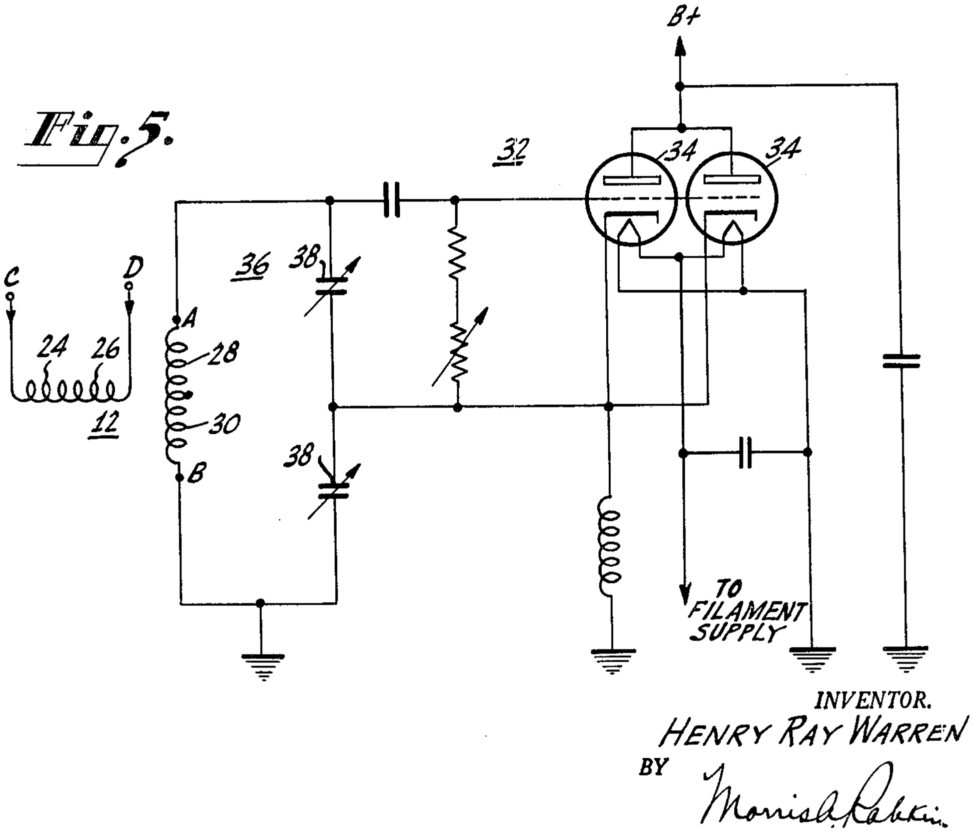
FIG. 5 is a schematic diagram of an oscillator circuit incorporating a frequency modulator magnetic head of the type shown in FIG. 1 or in FIGS. 3 and 4.

The circuits associated with the F.M. modulator head 12 are shown in FIG. 2. The terminals A and B of the oscillator windings and the terminals C and D of the modulating windings are shown connected to the head 12 and will be understood to be connected to the oscillator and modulting windings thereof in FIG. 2. A carrier oscillator 32 is connected across the terminals A and B so as to include the oscillator windings 28 and 30 in the frequency determining network thereof. A suitable circuit for the carrier oscillator 32 is shown in FIG. 5.

The oscillator 32 is of the Colpitts type. The characteristics and operation of a Colpitts type oscillator are described, for example, in a text entitled "Electronic Circuits and Tubes" by the Electronics Staff of the Cruft Laboratories (McGraw-Hill Book Company, 1947), page 488. The oscillator circuit 32, as distinguished from the circuit in the text, includes a pair of triodes 34 connected in parallel. Otherwise, the circuit in the text and that of FIG. 5 are similar. The oscillator windings 28 and 30 are connected in the frequency determining or tank circuit 36 of the oscillator 32. The inductance of the oscillator windings 28 and 30 determines the frequency of the oscillations generated by the oscillator 32. These windings 28 and 30 also act as a load on the oscillator. In the quiescent state, when no signals are applied to the modulating windings 24 and 26 of the head, the oscillator generates oscillations at its nominal frequency of the oscillation, for example, 5.5 megacycles per second. This frequency of oscillation is mentioned, solely for the purpose of example, as suitable for video frequency signal recording. However, the oscillator 32 may be adjusted to generate oscillations at other frequencies, for example, by changing the value of the capacitance presented by the capacitors 38 in the tank circuit 36.

Returning to FIG. 2, the terminals C and D of the modulating windings of the head 12 are connected to the output of a video amplifier 40, so that the amplifier is inductively coupled to the core of said head. The video signals, which carry the information to be recorded on the magnetic record tape 10, are applied to the input of the video amplifier. A source of direct current (D.C.) bias, shown illustratively as a battery 42, is connected in series with a choke coil 44 between the terminals C and D of the modulating windings. The choke 44 prevents shorting of the video amplifier output by the low internal resistance of the battery 42.

In operation, the direct current from the battery 42, which flows through the modulating windings 24 and 26, establishes a magnetomotive force which biases the bottom core legs 14 and 16 to a point below the knee of their hysteresis characteristic. The output signals from the video amplifier 40 are sufficient to establish a magnetomotive force which drives the bottom core legs 14 and 16 into saturation on those half cycles of the video signal which have the same polarity as the D.C. bias from the battery 42. However, the signals from the video amplifier which are of opposite polarity will not establish magnetomotive forces to drive the core legs 14 and 16 to saturation, because of the D.C. bias. Accordingly, the saturation of the bottom core legs 14 and 16 increases once during each cycle of the video signals. As will be brought out more clearly hereinafter, the rate of the frequency deviations of the oscillations generated by the carrier oscillator 32 corresponds to the frequency of the video signals, rather than to the second harmonic of the frequency of the video signals.

Variation in the degree of saturation of the bottom core legs 14 and 16 causes the permeability presented by these core legs 14 and 16 to change. Since the core legs 14 and 16 are included in the second magnetic circuit together with the side legs 18 and 20, the effective permeability of the second magnetic circuit changes. The inductance of a coil having a ferromagnetic core is a function of the permeability of that core. Accordingly, the inductance presented by the oscillator coils 28 and 30 varies in accordance with the permeability of the core legs 14 and 16. The degree of saturation of the bottom core legs 14 and 16 depends upon the amplitude of the video signals applied to the modulating windings 24 and 26. The permeability of the core legs 14 and 16 thus follows the amplitude of the video signals. The inductance of the oscillating coils 28 and 30 therefore decreases as a function of the amplitude of the video signals applied to the modulating windings 24 and 26.

The resonant frequency of the tank circuit 36 (FIG. 5) increases as the inductance of the oscillating windings 28 and 30 decreases, in accordance with the established relationship for the resonant frequency of a parallel resonant circuit. Accordingly, the oscillations generated in the oscillator 32 change in frequency as a function of the amplitude of the video signals which are applied to the modulating windings.

The frequency of oscillation of the oscillator 32 deviates once during each cycle of the video signals because of the direct current bias which is applied to the modulating windings 24 and 26, as mentioned above. Accordingly, the rate at which the frequency of the oscillations from the oscillator 32 deviates from its nominal frequency (e.g. 5.5 megacycles per second) is proportional to the frequency of the video signals. Without the D.C. bias, both the positive and the negative going half cycles of the video signals might drive the lower core legs 14 and 16 toward saturation. This would cause the rate of deviation in the frequency of oscillation of the oscillator to be proportional to the second harmonic of the frequency of the video signal.

The tank circuit 36 of the oscillator 32 (FIG. 5) is always resonant at the frequency of the oscillations generated by the oscillator 32. The oscillator 32, establishes an alternating magnetic flux in the second magnetic circuit including the side core legs 18 and 20 and the bottom core legs 14 and 16. This flux traverses the signal gap 22 and is recorded on the magnetic record tape 10 as a magnetic signal. Since the frequency of the oscillations generated by the osillator 32 is deviated at a rate and by an amount related to the video signals applied to the modulating windings 24 and 26, the alternating magnetic flux which is applied to the tape 10 is effectively modulated in frequency by the video signals.

The power requirements of the recording head are reduced since the oscillator windings 28 and 30 are included in a parallel resonant tank circuit 36 which is always resonant at the frequency of the signals applied thereto. The inductance presented by the oscillator windings 28 and 30 is varied so that the tank circuit 36 (FIG. 5) is resonant at a frequency which is substantially equal to the frequency of the oscillations applied to the circuit 36 by the oscillator. The current and the power drawn by a parallel resonant circuit is at a minimum at the resonant frequency of that circuit. Moreover, the current through the oscillator windings 28 and 30 is approximately equal to Q times the current supplied by the oscillator to the windings 28 and 30, where Q is the Q of the oscillator windings, as defined by the expression, $$Q=\frac{\omega L}{R}$$

These relationships are known and are described in the above referenced text on pages 42 to 45 thereof. Since the current through the oscillator windings 28 and 30 establishes the recording flux in the head, the recording power is equal to the power drawn by the oscillator reduced by a factor approximately equal to the Q of the oscillator windings 28 and 30. The magnetic head 12 therefore requires only a small amount of operating power for recording frequency modulated signals.

Figure 3:
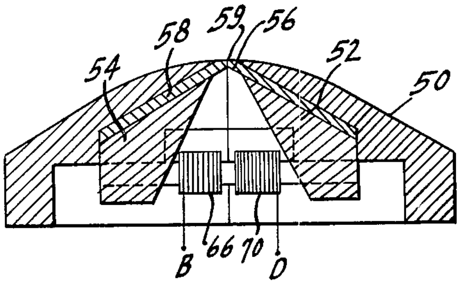
FIG. 3 is a sectional view of another embodiment of a frequency modulator magnetic head in accordance with the invention.
Figure 4:
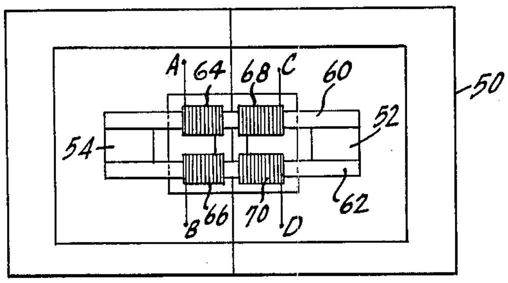
FIG. 4 is a bottom view of the head shown in FIG. 3.

Referring to FIGS. 3 and 4, a form of frequency modulator head is shown which is especially adaptable to miniaturization. This recording head includes a support member 50 of non-magnetic material such as aluminum or stainless steel. This support member is a two part structure. The magnetic head includes a pair of side core legs 52 and 54. These core legs 52 and 54 are wedge shaped members having pole pieces 56 and 58 affixed thereto. The pole pieces are separated from each other by a signal gap 59. The pole pieces may be formed from Alfenol. The remainder of the core legs 52 and 54 may be formed of ferrite. Alternatively, each core leg 52 and 54, may be an integral piece of Sendust. Sendust is an aluminum-iron-silicon alloy which is known in the art. The head includes a pair of bottom core legs 60 and 62 which are disposed on opposite sides of the lower ends of the side core legs 52 and 54. These bottom core legs are desirably formed from magnetic material having an "S" shaped hysteresis characteristic. A material such as Alfenol or Sendust may be suitable.

A pair of oscillator windings 64 and 66 are wound on the bottom core legs 60 and 62, respectively. These oscillator windings are connected in series aiding relationship, as in the case for the oscillator windings 28 and 30 in FIG. 1. A pair of modulating windings 68 and 70 is wound on the bottom core legs 60 and 62 adjacent to oscillator windings 64 and 66 respectively. The modulating windings are balanced as in the case with the modulating windings 24 and 26. Terminals A and B are connected to the oscillator windings 64 and 66, and terminals C and D are connected to the modulating windings 68 and 70 in the same manner as shown in FIG. 1. A first magnetic circuit is defined by the bottom core legs 60 and 62, and a second magnetic circuit, including the bottom core legs, is defined by the bottom core legs, and the side core legs 52 and 54. This first magnetic circuit includes the signal gap 59. The circuits shown in FIGS. 2 and 5 are connected to the terminals A, B, C, and D as explained for the modulator head 12.

The magnetic head of FIGS. 3 and 4 has the same magnetic circuit relationships and operation as the magnetic head shown in FIG. 1.

Certain advantages inhere from the close proximity of the oscillator windings and the modulating windings. Closer coupling exists between the modulating and oscillating windings in the head of FIGS. 3 and 4 than in the head of FIG. 1. The inductance variation of the oscillating windings is therefore increased. These increased inductance variations also follow from the fact that both the oscillating and modulating windings are on the bottom core legs which experience the greatest change in permeability. The side core legs 52 and 54 may also be smaller than the side core legs 18 and 20. Accordingly, the reluctance presented by these core legs is decreased. This decreases the power requirements of the head and increases the sensitivity of the head to the modulating signal from the video amplifier 40. This position of the windings on the core legs also permits the entire structure to be housed in a reduced space.

From the foregoing description, it will be apparent that there has been provided an improved system for the magnetic recording of frequency modulated signals. This system has features of reduced power consumption, low cost and compactness, all of which are particularly advantageous in mobile, airborne and space-borne equipment applications. Many features, such as that of reduced power consumption, may be generally applicable in variable frequency circuits. Variations in frequency modulation circuits and in magnetic heads embodying the features of, and coming within the scope of, this invention will undoubtedly readily suggest themselves to those skilled in the art. Accordingly, the foregoing description should be considered illustrative and not in any limiting sense.

What is claimed is:

1. A system for magnetic recording of frequency modulated signals on a magnetic record which comprises a magnetic head having a core with a signal gap for scanning said record, a modulating winding on said core, an oscillator winding on said core, an oscillator having a frequency determining network including said oscillator winding and operative to establish a magnetic signal flux across said gap for recording on said record, and means for applying modulating signals to said modulating winding for varying the permeability of said core whereby to modulate the frequency of said signal flux.

2. A system for the magnetic recording of frequency modulated signals comprising a magnetic head having a core of magnetic material having a signal gap for scanning said record, a balanced modulating winding on said core, an oscillator winding also wound on said core, an oscillator circuit having a tank circuit including said oscillator winding for establishing a magnetic signal flux across said gap, and means for applying a modulating signal to said modulating winding for changing the permeability of said core whereby to modulate the frequency of said signal flux.

3. A system for the magnetic recording of frequency modulated signals comprising a magnetic head having a core of magnetic material having a signal gap for scanning said record, a balanced modulating winding on said core, an oscillator winding also wound on said core, an oscillator circuit having a tank circuit including said oscillator winding for establishing a magnetic signal flux across said gap, and means for applying a modulating signal which includes a direct current component to said modulating winding for changing the permeability of said core whereby to modulate the frequency of said signal flux.

4. A system for the magnetic recording of frequency modulated signals on a magnetic record which comprises a magnetic head having a first pair of core legs which are spaced from each other and a second pair of core legs which have a signal gap therebetween, said first pair of core legs being coupled to said second pair of core legs, a first closed magnetic circuit including said first pair of core legs, said second pair of core legs and first pair of core legs together completing a second magnetic circuit including and closed except for said signal gap, a pair of modulating windings on said first pair of core legs balanced with respect to said second magnetic circuit, an oscillator winding around at least one of said core legs for establishing magnetic flux around said second magnetic circuit and across said gap, an oscillation generating circuit having a frequency determining network including said oscillator winding, and means for applying a modulating signal carrying information to be recorded on said record to said modulating windings for varying the permeability of said first pair of core legs whereby to vary the inductance of said oscillator winding, the frequency of oscillation of said oscillator and the frequency of said magnetic flux.

5. A system for the magnetic recording of frequency modulated signals on a magnetic record which comprises a magnetic head having a first pair of core legs which are spaced from each other and a second pair of core legs which have a signal gap therebetween, said first pair of core legs being coupled to said second pair of core legs, a first closed magnetic circuit including said first pair of core legs, said second pair of core legs and said first pair of core legs together completing a second magnetic circuit including and closed except for said signal gap, a pair of modulating windings on said first pair of core legs balanced with respect to said second magnetic circuit, an oscillator winding around at least one of the core legs of said second pair of core legs for establishing magnetic flux around said second magnetic circuit and across said gap, an oscillation generating circuit having a frequency determining network including said oscillator winding, and means for applying a modulating signal carrying information to be recorded on said record to said modulating windings for varying the permeability of said first pair of core legs whereby to vary the inductance of said oscillator winding, the frequency of oscillation of said oscillator and the frequency of said magnetic flux.

6. A system for the magnetic recording of frequency modulated signals on a magnetic record which comprises a magnetic head having a first pair of core legs which are spaced from each other and a second pair of core legs which have a signal gap therebetween, said first pair of core legs being coupled to said second pair of core legs, a first closed magnetic circuit including said first pair of core legs, said second pair of core legs and said first pair of core legs together completing a second magnetic circuit including and closed except for said signal gap, a pair of modulating windings on said first pair of core legs balanced with respect to said second magnetic circuit, an oscillator winding around each of the legs of said first pair of core legs in flux aiding relationship for establishing magnetic flux around said second magnetic circuit and across said gap, an oscillation generating circuit having a frequency determining network including said oscillator winding, and means for applying a modulating signal carrying information to be recorded on said record to said modulating windings for varying the permeability of said first pair of core legs whereby to vary the inductance of said oscillator winding, the frequency of oscillation of said oscillator and the frequency of said magnetic flux.

7. A system for magnetic recording of signals on a magnetic record comprising:

(a) a magnetic head cooperable with said record and having a core of magnetic material with an effective signal gap, (b) means for establishing an alternating magnetic flux in said core at a frequency corresponding to the permeability of said core, and (c) means responsive to said signals for varying the permeability of said core according to the characteristics of said signals.

References Cited by the Examiner

UNITED STATES PATENTS

| | | | |
|---|---|---|---|
| 2,382,615 | 8/1945 | Donley | 332—29 |
| 2,536,260 | 1/1951 | Burns. | |
| 2,539,876 | 1/1951 | Von Behren | 179—100.2 |
| 2,855,464 | 10/1958 | Wiegand | 179—100.2 |
| 2,855,466 | 10/1958 | Wiegand | 179—100.2 |
| 2,920,146 | 1/1960 | Grift et al. | 179—100.2 |
| 3,133,782 | 5/1964 | Woods | 346—74 |

IRVING L. SRAGOW, *Primary Examiner.*

BERNARD KONICK, *Examiner.*